United States Patent [19]

Brown et al.

[11] Patent Number: 4,796,469
[45] Date of Patent: Jan. 10, 1989

[54] APPARATUS AND PROCESS FOR MEASURING CHANGE OF LIQUID LEVEL IN STORAGE TANKS

[75] Inventors: Robert L. Brown, Buena Park; Roger W. Richesson, Huntington Beach, both of Calif.

[73] Assignee: B-Conn, Inc., Huntington Beach, Calif.

[21] Appl. No.: 26,113

[22] Filed: Mar. 16, 1987

[51] Int. Cl.$^4$ .............................................. G01M 3/26
[52] U.S. Cl. ...................................... 73/49.2; 73/319; 73/322.5
[58] Field of Search .................... 73/49.2, 290 R, 293, 73/319, 322.5, 448; 374/4

[56] References Cited

U.S. PATENT DOCUMENTS

| | | | |
|---|---|---|---|
| 1,417,892 | 5/1922 | Ehrentraut | 73/49.2 |
| 3,460,386 | 8/1969 | Guignard | 73/299 |
| 3,841,146 | 10/1974 | Cross et al. | 73/49.2 |
| 3,889,523 | 6/1975 | Nolte | 73/290 V |
| 4,373,815 | 2/1983 | Bruce | 356/358 |
| 4,397,183 | 8/1983 | Ballou, et al. | 73/293 |
| 4,474,054 | 10/1984 | Ainlay | 73/49.2 |
| 4,561,291 | 12/1985 | Ainlay | 73/49.2 |
| 4,604,893 | 8/1986 | Senese et al. | 73/49.2 |
| 4,646,560 | 3/1987 | Maresca, Jr. et al. | 73/49.2 |
| 4,672,842 | 6/1987 | Hasselman | 73/49.2 |

FOREIGN PATENT DOCUMENTS 276474  10/1970  U.S.S.R. .............................. 73/49.2

OTHER PUBLICATIONS

"Underground Tank Leak Detection Methods: A State-of-the-Art Review", by Shahzad Niaki, et al., Publication of United States Environmental Protection Agency, Research and Development, EPA/600-/2-86/001, Jan., 1986.

Primary Examiner—Stewart J. Levy
Assistant Examiner—Hezron E. Williams
Attorney, Agent, or Firm—Klein & Szekeres

[57] ABSTRACT

Process and apparatus for measuring liquid level changes in horizontally disposed cylindrical storage tanks compensates for thermal expansion and contraction of the liquid in the tank during the measurements. A vertically disposed substantially cylindrical container in the storage tank has a valve which controls fluid communication between the container and the storage tank. A float and associated sensing mechanism measure the level of liquid in the container. A measurement of the liquid level is made in the beginning of the test with fluid communication open between the container and the tank. A second measurement is taken after a fixed time period during which fluid communication between the container and the tank is closed. From the second measurement a theoretical liquid level is calculated which would exist in the tank due to temperature effects, and without leakage. With fluid communication between the container and the tank open against a third liquid level meaurement is made to measure changes due to leakage. Liquid is thereafter added or withdrawn to restore the theoretical liquid level in the tank and the quantify the volume of leakage. The float utilized in the container preferably includes a shaft fixedly mounted to the container, and a damper piston mounted to the shaft. A float cup which engages the damper piston has a flexible diaphragm mounted to it. The diaphragm engages the shaft and substantially centers the float cup about the shaft.

16 Claims, 2 Drawing Sheets

APPARATUS AND PROCESS FOR MEASURING CHANGE OF LIQUID LEVEL IN STORAGE TANKS

BACKGROUND OF THE INVENTION

1. Field of the Invention

The present invention is directed to an apparatus and process for measuring the changes in the level of liquid stored in storage tanks. More particularly, the present invention is directed to an apparatus and process for measuring leakage of liquids, such as hydrocarbon fuels, out of underground storage tanks in a manner which compensates for density changes of the stored liquid which may occur during the measurement due to changes in the temperature of the stored liquid.

2. Brief Description of the Prior Art

Leakage to the surrounding environment of hydrocarbon fuels from underground storage tanks normally associated with filling stations represents a significant environmental and fire hazard, especially where a relatively large number of filling stations are located in urban or other environmentally sensitive areas. Leakage from underground storage tanks of liquid chemicals or flammable liquids other than hydrocarbon fuels likewise create significant environmental and fire hazards. For this reason, most jurisdictions in the United States require periodic inspection of storage tanks of filling stations, and usually set the permissible maximum limit of leakage from an entire tank at approximately 0.05 gallon of hydrocarbon fuel (gasoline or diesel fuel) per hour.

A well established and relatively simple procedure of the prior art for inspecting storage tanks of filling stations for leakage includes the steps of adding fuel to the tank until the liquid level is disposed within the filling pipe of the tank, marking or noting the liquid level, and thereafter adding an additional measured amount (for example, 0.5 gallon) of fuel. The rise of the level of the liquid in the usually cylindrical fill pipe is then measured in inches or centimeters. Thereafter, the tank is kept undisturbed, that is, fuel is not dispensed from the tank for several hours, usually at least for four hours. At the end of the prescribed time period, the level of liquid in the fill pipe is measured again, and the leakage rate is calculated from the results of the above-summarized measurements. Occasionally, instead of fuel leaking out of the tank, ambient ground water leaks into the tank. Theoretically, the above-described process is capable of detecting this type of tank defect also.

Serious disadvantages of the above-described prior art measuring or inspecting process include the following.

Measuring of liquid levels by a metering rod, or like gauge, is inherently inaccurate enough so that it can be conducted with any degree of reliability only in the relatively narrow cylindrical fill pipe. Moreover, because the typical storage tank is a horizontally disposed cylinder which has gradually narrowing curved upper walls, no meaningful "gallon per hour" figure is calculated from simple linear liquid level measurements, except in the vertically disposed cylindrical fill pipe. Filling the tank to such a high level, however, increases the hydrostatic pressure in the storage tank above the average or usual pressure, to the extent that the underground structure of the tank is subjected to a potentially significant expansion resulting in a gradual change in the volume of the tank. The extent of this extension of structure and the resulting volume change is, however, unpredictable because it is strongly influenced by the conditions of the soil wherein the storage tank is buried. Experience has shown that the error, which may result from a change in tank volume caused by the increased hydrostatic pressure, may very well be in the magnitude of 0.05 gallon per hour. Such an error may, of course, cause the results of the entire leakage measurement to be totally erroneous to the point where impermissible leakage is detected where it does not exist. Alternatively, such an error may totally mask impermissible leakage of ground water into the tank.

It is apparent from the foregoing that a process and appropriate implementing apparatus are needed which measure liquid levels in storage tanks without requiring the tanks to be filled to the brim for the measurements. Moreover, changes in the level of the liquid must be monitored with much greater accuracy than what is attainable by a simple measuring rod, especially when the measurement is not conducted with the liquid levels being in the cylindrical fill pipe.

In partial fulfillment of these objectives instruments were designed relatively recently for use in underground storage tanks of filling stations which measure liquid levels with much greater accuracy than a simple metering rod. U.S. Pat. Nos. 4,397,183 and 4,373,815 describe, for example, apparatus wherein a signal emitter emits laser or infrared light which is, in turn, reflected from a float tracking the liquid level in the tank. The reflected signal is received in a receiver and is utilized to measure the position of the float with a relatively large degree of accuracy.

U.S. Pat. Nos. 4,474,054 and 4,561,291 disclose apparatus wherein a slope tube is mounted to the fill pipe of a storage tank, the level of fuel in the tank is maintained in the fill pipe, and gas is slowly bubbled into the fill pipe in such a manner that the gas pressure maintains a liquid level in the slope tube. As the liquid level changes in the fill pipe due to leakage, the pressure of the gas bubbling up through the liquid in the fill pipe also changes, and the resulting change is detected in the slope tube.

A publication by the U.S. Environmental Protection Agency, titled UNDERGROUND TANK LEAK DETECTION METHOD: A STATE-OF-THE-ART REVIEW, dated January, 1986, reviews still other types of apparatus and processes for detecting leaks in underground storage tanks.

Although the above-mentioned and relatively recently developed prior art solves some of the problems associated with detection of leaks from underground fuel tanks, significant problems remain unsolved in this connection. For example, still many of the recently developed prior art methods require filling the tank until the liquid level reaches the fill tube. Moreover, the temperature of the fuel in the tank frequently changes enough to render the entire measurement erroneous, because the density and hence the volume of the fuel changes with temperature.

The prior art has attempted to compensate for these effects of temperature changes by monitoring the temperature of the fuel in the tank and then calculating an adjustment for the resulting density changes. An alternative method of the prior art for compensating the effects of temperature changes during the leakage measurements comprise monitoring the fuel level in a closed container submerged in the tank. This alternative method utilizes the principle that level changes in the closed container are necessarily due to temperature induced density changes only, and cannot be attributed to leakage. The measured level change in the closed container is then used as a compensating factor to be deducted from, or added to, level changes in the storage tank. This alternative method of the prior art, however, fails to take into consideration the fact that level changes in a vertically disposed cylindrical container are, generally speaking, not identical to the level changes caused by identical density changes in the storage tank. This is because the storage tank is a horizontally disposed cylinder having curved walls which result in gradually changing vertical cross-sections.

It is apparent, in light of the foregoing, that apparatus and processes are needed in the art which are capable of accurately measuring leakage of liquid in and out of underground storage tanks, and which are capable of compensating for temperature-induced density changes of the liquid. The present invention provides such apparatus and processes.

SUMMARY OF THE INVENTION

It is an object of the present invention to provide a process for accurately measuring leakage of liquid into or out of storage tanks, particularly into or out of storage tanks for hydrocarbon fuels used in filling stations and the like.

It is another object of the present invention to provide an apparatus for accurately measuring leakage of liquid into or out of storage tanks, particularly into or out of storage tanks for hydrocarbon fuels used in filling stations and the like.

It is still another object of the present invention to provide a process and apparatus for accurately measuring leakage of liquid into or out of storage tanks, which adequately compensate for changes in the temperature of the liquid which occur during the measurements.

The foregoing and other objects and advantages are attained by a process wherein a tubular container is placed into the storage tank in such a position that the longitudinal axis of the container is substantially vertical and its bottom reaches substantially to the bottom of the tank.

In accordance with one aspect of the invention, the horizontal cross-section of the container is constant along the vertical axis of the container whereby the volume of the liquid contained in the container is a linear function of the height of the liquid level in the container. A simple cylindrical tube meets this requirement.

The container is first allowed to be in fluid communication with the storage tank whereby the levels of liquid in the tank and the container are equal. The level is then measured to provide a first liquid level reading. The fluid communication between the tubular container and the storage tank is thereafter shut off for a measured time period. At the end of the time period the level of liquid in the tubular container is measured again to provide a second liquid level reading. Any different between the first and second readings is due solely to thermal expansion or contraction of the liquid in the closed tube. Based on the first liquid level reading and on the difference between the first and second readings, a theoretical liquid level is calculated for the tank, the theoretical level being where the liquid level should be in the tank as a result of thermal expansion or contraction and in the absence of any leakage.

Fluid communication is then again established between the tank and the tubular container and the liquid level is measured to provide a third liquid level reading. The difference between the theoretical liquid level and the third reading provides the basis for measuring or calculating the amount of liquid which has leaked out of or into the tank. The volume of leakage can be obtained, for example, by adding or withdrawing sufficient liquid from the tank until the theoretical liquid level is restored.

In accordance with another aspect of the invention, the tubular container has a configuration such that the volume of liquid contained in the container bears the mathematical relationship to the volume of liquid in the tank which is expressed by the equations $$V_1 = f(h) \text{ and}$$

$$V_2 = K_1 + K_2 f(h)$$

wherein f(h) expresses a non-linear function, $V_1$ is the volume of liquid in the tank, $V_2$ is the volume of liquid in the container, h is the height of the liquid level in the container and in the tank relative to a joint reference point, such as the bottom of the tank, and $K_1$ and $K_2$ are constants. $K_1$ may be zero. When the volumes of the tank and of the tubular container bear the just-noted relationship, temperature-induced liquid level changes in the tubular container and in the tank are equal throughout the entire vertical cross-section of the tank. Therefore, the theoretical liquid level in the tank, which would arise in the tank without leakage, is identical to the level actually measured in the tubular container after expiration of the fixed time period. Accordingly, the amount of leakage into or out of the container can be calculated from the difference between the second and third liquid level readings. Alternatively, liquid can be added to or be withdrawn from the storage tank so as to restore the liquid level to the value of the second reading. The amount of liquid which must be added or withdrawn in this manner provides the volume of leakage during the fixed time period.

Tubular containers which satisfy the above-noted mathematical relationship, with respect to standard cylindrical underground storage tanks having flat, spherical or semi-elliptic ends, respectively, are constructed in the configuration of a "pregnant" tube, that is, a tube having gradually diminishing cross-sections as viewed from the center of the tube.

The features of the present invention can be best understood, together with further objects and advantages, by reference to the following description taken in conjunction with the accompanying drawings.

DESCRIPTION OF THE PREFERRED EMBODIMENTS

The following specification, taken in conjunction with the drawings, sets forth the preferred embodiment of the present invention. The embodiments of the invention disclosed herein are the best modes contemplated by the inventors for carrying out their invention in a commercial environment, although it should be understood that various modifications can be accomplished within the parameters of the present invention.

Figures 1, 2:
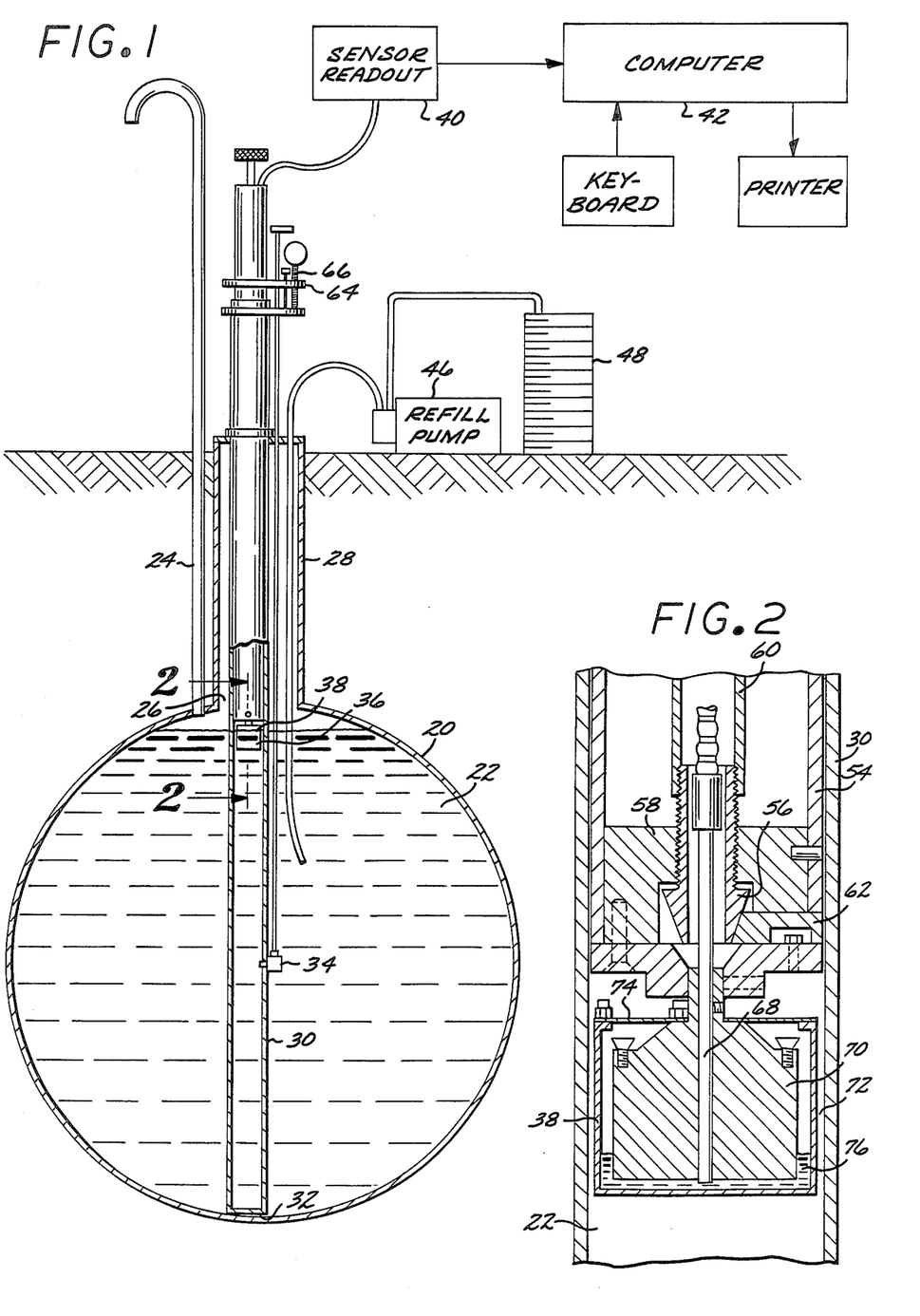
FIG. 1 is a schematic view of a first preferred embodiment of the apparatus of the present invention, an underground storage tank and part of the apparatus being shown in cross-section.
FIG. 2 is a cross-sectional view of the float mechanism of the first preferred embodiment, the cross-section being taken on lines 2,2 of FIG. 1.

Referring now to the drawing Figures, and particularly to the schematic view of FIG. 1, the principles of operation of the present invention are disclosed. As it was noted in the introductory section of the present application for patent, an important application of the process and apparatus of the present invention is for the detection of leakage of liquid hydrocarbon fuel (such as gasoline or diesel fuel) out of storage tanks of the type which are normally buried underground in filling stations or the like, or for the detection of seepage of ground water into such storage tanks of filling stations. For this reason, the present invention is described in connection with measurements of leakage out from or into "conventional" storage tanks of filling stations, although the scope of the invention is not so limited. In fact, the apparatus and process of the present invention can be utilized for accurately monitoring the liquid level in virtually all horizontally disposed cylindrical storage tanks.

Keeping the foregoing in mind, FIG. 1 schematically illustrates a conventional elongated, horizontally disposed cylindrical storage tank 20 of a filling or gasoline station. A pipe (not shown) leading almost to the bottom of the tank 20 connects the tank 20 with a conventional pump (not shown) which dispenses the hydrocarbon fuel 22. A vent pipe 24 leads to the top of the tank 20 for normally preventing accumulation of vapor or pressure in the tank 20. In some jurisdictions the vent pipe 24 is required by law to lead to a suitable scrubber or like device (not shown) designed to capture hydrocarbon vapors (not shown) so as to prevent their escape into the environment. In order to increase the accuracy of the hereinafter-described measurements the vent pipe 24 may be capped for the duration of the measurement, thereby preventing loss of fuel 22 by evaporation.

A fill hole 26 is provided on the top of the storage tank 20. The fill hole 26 connects to a vertically disposed cylindrical fill pipe 28 which is schematically shown on FIG. 1. The fill hole 26 is normally closed off with a filler cap (not shown) and is normally used for introducing hydrocarbon fuel 22 to the tank 20. As it was described in the introductory section of the present patent application, in accordance with many established prior art procedures of testing conventional gasoline (or diesel fuel) storage tanks of filling stations, it is necessary to fill the tank 20 with sufficient fuel 22 so as to raise the liquid level into the fill pipe 28. As it will become apparent from the following description, this is not necessary in connection with the present invention.

Referring still principally to the schematic view of FIG. 1, it is apparent that a linear relationship between the height of the fuel level and fuel volume exists in the cylindrical fill pipe 28, but not in the tank 20. Virtually all tanks 20 of filling stations are horizontally disposed cylinders as is shown on FIG. 1. In fact, tanks 20 of filling stations usually come in standard sizes, that is, storage tanks having 6,000, 8,000, and 10,000 gallon storage capacity are considered standard, with 10,000 gallon tanks being most common in filling stations. Moreover, many standard tanks are made of steel and have flat ends, whereas other standard tanks are made of fiberglass and have either spherical or semi-elliptic ends.

It is an important aspect of the present invention that the mathematical relationship between the fuel level in the tank and volume of fuel in the tank on the one hand, and temperature expansion on the other hand, are taken into consideration in order to obtain accurate measurements for leakage.

It follows from consideration of the geometry of horizontally disposed cylindrical storage tanks that the horizontal cross-sectional area (A) of the tank as a function of height (h) above the tank bottom is described by the following Equations 1-3.

$$A = 2L \times \sqrt{Dh - h^2} \qquad \text{EQUATION 1}$$

$$A = 2L \times \sqrt{Dh - h^2} + \pi(Dh - h^2) \qquad \text{EQUATION 2}$$

$$A = 2L \times \sqrt{Dh - h^2} + \frac{\pi}{2}(Dh - h^2) \qquad \text{EQUATION 3}$$

wherein h is the height of the horizontal plane from the tank bottom; D is the diameter of the cylindrical storage tank, and L is the length of the cylindrical portion of the tank.

Equation 1 applies to tanks having flat ends; Equation 2 applies to tanks having spherical ends, and Equation 3 applies to tanks having semi-elliptic ends.

From the foregoing relationships, the volume (V) of the fuel contained in the tank 20 can be calculated as a function of height (h) above the tank bottom.

For a cylindrical tank having flat ends, the volume V is given by Equation 4:

$$V = K \times [\pi D^2/8 + (h - D/2) \times \sqrt{Dh - h^2} + \\ D^2/4 \times \arcsin(2 \times (h - D/2)/D)] \qquad \text{EQUATION 4}$$

$$V = L \times [\pi D^2/8 + (h - D/2) \times \sqrt{Dh - h^2} + \\ D^2/4 \times \arcsin(2 \times (h - D/2)/D] + 4 \times \pi/3 \times \\ D^3/8 - \pi/3 \times (D - h)^2 \times (D/2 + h) \qquad \text{EQUATION 5}$$

$$V = L \times [\pi D^2/8 + (h - D/2) \times \sqrt{Dh - h^2} + \\ D^2/4 \times \arcsin(2 \times (h - D/2)/D)] + 2 \times \pi/3 \times \\ D^3/8 - \pi/6 \times (D - h)^2 \times (D/2 + h) \qquad \text{EQUATION 6}$$

Equations 5 and 6 describe the volume (V) of fuel as a function of height (h) for cylindrical tanks having spherical and semi-elliptic ends, respectively.

A common characteristic of Equations 4, 5, and 6, of course, is that the volume (V) is a non-linear function of the liquid height (h) above the bottom of the tank. This feature can be characterized by the expression $V = f(h)$ wherein f denotes a non-linear function.

The incremental change of volume in the tank due to an incremental change in fluid level (the differential dV/dh) is equal to the respective cross-sectional areas (A) and is expressed by Equations 7, 8, and 9:

$$dV/dh = 2L \times \sqrt{Dh - h^2} \qquad \text{EQUATION 7}$$

$$dV/dh = 2L \times \sqrt{Dh - h^2} + \pi(Dh - h^2) \qquad \text{EQUATION 8}$$

$$dV/dh = 2L \times \sqrt{Dh - h^2} + \frac{\pi}{2}(Dh - h^2) \qquad \text{EQUATION 9}$$

Equation 7 refers to cylindrical tanks having flat ends, such as the steel tanks used for underground storage of gasoline or diesel fuel, whereas Equations 8 and 9 refer to tanks having spherical and semi-elliptic ends, respectively.

Based on the foregoing equations, Tables 1, 2, and 3 were generated showing, as a function of liquid level (h), the volume (V) of fuel contained in the tank, the percentage of fullness (% full) of the tank, the incremental volume change per incremental height change (dV/dh), and the incremental level change upon adding 200 ml of liquid to the tank (dh/200 ml).

Referring now back primarily to FIG. 1, in accordance with the first preferred embodiment of the present invention, a tubular container or measuring tube 30 is temporarily mounted into the storage tank 20 through the fill hole 26 and fill pipe 28. The cross-sectional area of the measuring tube 30 is constant along the vertical axis of the tube 30. This requirement is readily satisfied by a cylindrical tube. The volume of liquid contained in the measuring tube 30 is directly proportional to the height of the liquid in the tube 30. The tube 30 reaches to the bottom 32 of the storage tank, and has a valve 34 which can be manually controlled from the surface and which permits opening or closing fluid communication between the internal volume of the tube 30 and the storage tank 20.

A float and sensor assembly 36 is mounted into the measuring tube 30 into a location such that the position of the float 38 indicates the level of the fuel 22 in the measuring tube 30. The sensor associated with the float 38 measures the position of the float 38 and displays the measured data on the surface. The data display 40 is only schematically shown on FIG. 1. It should be understood in connection with the foregoing that, within certain broad aspects of the present invention, the precise nature of the float and sensor assembly 36 is not critical, and state-of-the-art may be used. The position of the float 38 may be monitored or measured, for example, by a laser interferometer displacement sensor such as "LASER MEASUREMENT SYSTEM Model No. 5528A, manufactured by Hewlett-Packard Corporation. Alternatively and preferably, the position of the float 38 is monitored by a non-contact fiber optic probe displacement sensor, such as the MTI Model KD 320 fotonic sensor, manufactured by Mechanical Technology Inc. of Latham, N.Y. Eddy current type probe displacement devices, or capacitance type probe displacement devices, which are available in the state-of-the-art are also suitable for monitoring the position of the float 38.

In accordance with the first preferred embodiment of the invention, the valve 34 is first opened after the measuring tube 30 and associated float and sensor assembly 36 are mounted into the storage tank 20. Fuel 22 then enters the interior of the measuring tube 30, and the levels of fuel 22 in the tube 30 and in the tank 20 remain equal for as long as the valve 34 is open. The best mode of mounting the float and sensor assembly 36 into the measuring tube 30 so as to place it into operative position is described below in connection with the description of the preferred float and sensor assembly 36 of the present invention.

Once the float and sensor assembly 36 is in operative position, the location of the liquid level is measured, the resulting data may be displayed, and are preferably also inputted into a computer 42 which is connected to the data display 40 and to the float and sensor assembly 36.

Inasmuch as measurement of the absolute distance of the float 38 above the bottom 32 of the tank 20 may be difficult, or impractical, the position of the float 38 is best ascertained by adding a given amount of fuel to the tank 20 (for example, 200 ml of fuel), and measuring the displacement of the float 38 as a result of this addition. The position or height of the float 38 above the tank bottom 32 can then be found in the appropriate Table (such as Tables 1, 2, or 3, depending on the shape of the tank ends). In fact, the computer 38, having the information contained in Tables 1–3, can automatically select the corresponding depth (height) or fuel level value for the float 38, and the corresponding "percentage fullness of the tank" value ("% full" in the Tables) from the measured displacement of the float (dV/200 ml). The fuel level obtained as a result of the just-described first measurement is referred to, for the purposes of the present description, as the first liquid level reading ($h_1$). As it should be apparent from the foregoing, the first liquid level reading ($h_1$) represents the level of fuel in the storage tank 20 at the commencement of a time period during which leakage of fuel out of the tank 20, or leakage of ground water (not shown) into the tank 20, is measured. The first liquid level reading ($h_1$) is preferably entered and stored in the computer 42.

After the first liquid level reading ($h_1$) has been taken, fluid communication between the interior of the measuring tube 30 and the storage tank 20 is interrupted by closing the valve 34. The valve 34 remains closed for the duration of the leakage measurement. During this time, leakage of fuel 22 from the tank 20 (or seepage of ground water into the tank 20) affects only the liquid level in the tank 20 but not the liquid level in the closed measuring tube 30. Changes in fuel temperature, however, affect the liquid level in the measuring tube 30 also, because a substantial thermal equilibrium exists between the fuel trapped in the closed measuring tube 30 and the fuel contents of the tank 20.

It is noted with regard to the foregoing that normally at least 1 hour, and usually 3 to 5 hours or more, are required for conducting the leakage measurements. Measuring a rate of leakage of 0.05 gallon per hour (the maximum legally acceptable rate of leakage in most jurisdictions in the United States) from a storage tank of 10,000 gallon capacity is analogous to measuring a one drop per hour rate of loss of liquid from a bucket. Moreover, in a 10,000 gallon tank which is filled approximately 90% or more, a temperature change of 0.01° F. results in a total volume change of at least 0.05 gallon. From the foregoing it becomes readily apparent that compensating for temperature effects is very important in the context of the present invention.

In the majority of actual measurements, the temperature of the fuel 22 contained in the storage tank 20 in fact changes during the measurement, and the change usually amounts to more than 0.01° F. Moreover, the temperature distribution in the tank 20 is usually not uniform in the beginning of the measurement, nor at the end of the measurement. Rather, there usually is a temperature gradient in the tank 20. The present invention even compensates for errors due to the just-described temperature gradients, because a temperature gradient similar to the gradient in the tank also develops in the measuring tube 30.

At the end of the approximately 1 to 5 hour monitoring time period of the leakage measurement, a second liquid level reading ($h_2$) is obtained by measuring the position of the float 38 in the measuring tube 30 while the valve 34 is still closed. Any difference between the first and second liquid level readings is due solely to thermal expansion or contraction of the fuel 22. The theoretical fuel level in the tank 20 is then computed on the basis of the above-measured volume change in the measuring tube 30.

More specifically, the dimensions of the measuring tube 30 are well known. In the cylindrical (or like) tube 30, volume is directly proportional to height. From the measured level change ($\Delta h_m$) in the tube 30, the change in the volume of the liquid in the measuring tube 20 ($\Delta V_m$) is readily calculated by using a simple linear relationship. The thermal volume change ($\Delta V_m$) in the measuring tube 30 is directly proportional to the "theoretical" thermal volume change ($\Delta V_t$) in the entire tank 20, the factor being the known ratio of volumes of the fuel 22 in the tank 20 and in the measuring tube 30. On the basis of this known volume ratio, $\Delta V_t$ is readily calculated.

From the thus calculated value of the theoretical volume change ($\Delta V_t$) in the tank 20, the theoretical level change ($\Delta h_t$) in the tank 20 is calculated by using one of the Equations 7, 8, or 9. (In these equations, for the purposes of the calculations $dV = \Delta V_t$ and $dh = \Delta h_t$. In other words, a linear interpolation is made.) Once the theoretical level change ($\Delta h_t$) in the tank 20 has been calculated, the theoretical fuel level ($h_t$) in the tank also becomes available. In other words, $h_t$ is the level which should have been in the tank 20 at the end of the measurement, but for leakage of liquid out of, or into, the tank 20.

After the second liquid level reading ($h_2$) has been obtained at the end of the fixed time period for conducting the leakage measurement, the valve 34 is opened to reestablish fluid communication between the storage tank 20 and the interior of the measuring tube 30. The levels of fuel 22 in the measuring tube 30 and in the tank 20 are equalized again, and a third liquid level reading ($h_3$) is obtained. The difference ($h_t$ minus $h_3$) between the third liquid level reading ($h_3$) and the theoretical liquid level ($h_t$) is the measure of the amount of liquid which has leaked out of, or into, the tank 20. This amount of leakage can be calculated by using Equations 7, 8, or 9, where, for the purposes of these calculations, $dh = h_t - h_3$.

Preferably, however, in accordance with the present invention, fuel 22 is either added to or withdrawn from the tank 20 until the float and sensor assembly 36 indicates that the fuel level in the tank 20 is restored to the theoretical level ($h_t$). The amount of fuel added or withdrawn from the tank 20 in this manner is the measure of leakage during the time period of the measurement. The valve 34 is, of course, open while fuel 22 is added or withdrawn to permit fluid communication between the measuring tube 30 and the tank 20. A refill pump 46 and a measuring cylinder 48 are shown on FIG. 1 to schematically indicate the addition or withdrawal of a known amount of fuel from the tank 20.

It should be clearly understood in connection with the foregoing description that whereas only the first, second, and third liquid level measurements ($h_1$, $h_2$, and $h_3$) are critical for the practice of the invention, more frequent measurements, in fact continuous monitoring, may be desirable. In accordance with the preferred embodiment of the process of the invention, the position of the float 38 is continuously monitored during the entire time period of the measurement, the data are continuously displayed and may be recorded, for example, in a strip chart recorder (not shown), or the like. Also, the data are preferably entered into and stored in the computer 42, which preferably performs all the calculations.

Figures 3, 4:
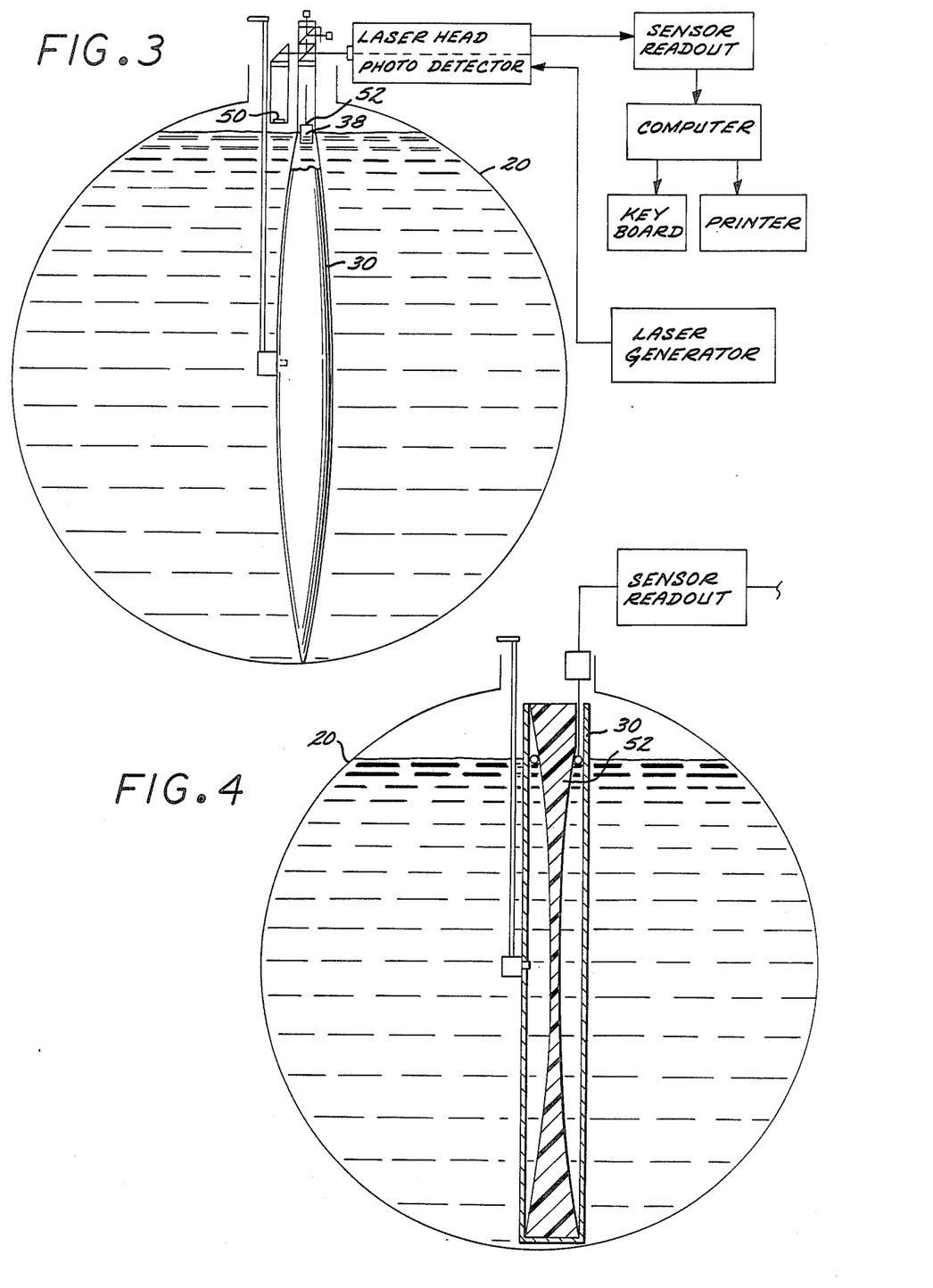
FIG. 3 is a schematic view of a second preferred embodiment of the apparatus of the present invention, an underground storage tank and part of the apparatus being shown in cross-section.
FIG. 4 is a schematic view of a third preferred embodiment of the apparatus of the present invention, an underground storage tank and part of the apparatus being shown in cross-section.

Referring now to FIG. 3 of the appended drawings, a second preferred embodiment of the process and apparatus of the present invention is disclosed. In accordance with the second preferred embodiment, the measuring tube 30 has a configuration which satisfies the following relationships relative to the volume of liquid in the storage tank 20:

$$V_1 = f(h) \text{ and}$$

$$V_2 = K_1 + K_2 f(h)$$

wherein $V_1$ is the volume of fuel in the tank 20, h is the level of the liquid in the tank 20, f(h) expresses the non-linear dependence of the liquid volume in the tank on the liquid level, $V_2$ is the volume of liquid in the measuring tube, $K_1$ and $K_2$ are constants, and $K_1$ may be zero.

The differentials of the foregoing functions are, respectively $$dV_1/dh = f'(h) \text{ and}$$

$$dV_2/dh = K_2 f'(h).$$

In other words, the measuring tube 30 of the second preferred embodiment meets the requirement that in any given horizontal cross-section of the tank 20 and of the tube 30, the respective cross-sectional areas of the tank 20 and of the tube 30 have the same ratio to one another, the ratio being a constant ($K_2$).

In still other words, $A_m = K_2 A$ substantially throughout the entire depth of the tank 20, where $A_m$ is the horizontal cross-section of the measuring tube 30, and A is the horizontal cross-section of the tank.

The foregoing requirement is satisfied by the measuring tube schematically shown on FIG. 3. The continuously changing diameter (or radii) of the horizontal cross-sections of such a "pregnant" measuring tube 30 can be calculated for the cylindrical containers mentioned in connection with Tables 1, 2, and 3, by multiplying, with a suitable constant factor, the square root of the dV/dh values listed in the Tables 1, 2, and 3. Tables 1, 2, and 3 thus list under the heading "TUBE" exemplary diameters of the measuring tubes 30 which are suitable, in accordance with the second preferred embodiment of the present invention, for use in connection with 96-inch diameter (steel) tanks having flat ends, 92-inch diameter (fiberglass) tanks having spherical and 92-inch diameter (fiberglass) tanks having semi-elliptic ends.

FIG. 3 indicates that the float and sensor assembly 36, employed in the second preferred embodiment, employs a laser interferometer, such as the LASER MEASUREMENT SYSTEM Model No. 5528A of Hewlett- Packard Corporation, mentioned earlier in this description. The laser measurement system, which per se is well known in the art and forms no part of the present invention, utilizes a split beam of laser light. One of the beams is reflected from a stationary reference mirror, shown schematically on FIG. 3 at 50, whereas the other beam is reflected from a mirror 52 mounted to the float 38.

Instead of the laser interferometer, other well known displacement sensing devices may also be used in the second preferred embodiment to determine the position of the float 38. An important distinguishing feature of the second preferred embodiment is the above-described "pregnant" measuring tube 30, which permits the leakage measurement to be conducted in the following manner.

The valve 34 is initially kept open whereby there is fluid communication between the interior of the measuring tube 30 and the tank 20. First, the position of the fuel level ($h_1$) in the tank 20 is established. This is done, for example, by adding 200 ml of fuel, measuring the resulting rise of the float 38, and by finding, in the appropriate Table, the depth or percentage fullness (% full) value which corresponds to the measured rise of the float 38. This selection from the Table is, of course, preferably performed by the computer 42. Thereafter, the valve 34 is closed, and the tank 20 is left undisturbed allowing leakage to occur out of, or into the tank 20. During this measurement, fuel 22 is not dispensed from nor added to the tank 20.

At the end of the known time period of the measurement, the position of the float 38 is again measured to provide a level change in the measuring tube ($\Delta h_m$) which is due solely to expansion or contraction of the fuel 22 caused by temperature changes. Thereafter, having measured the rise of the float ($\Delta h_m$), the absolute position of the float 38 in the measuring tube is readily obtained and is termed the second liquid level reading ($h_2$).

In the second preferred embodiment, in contrast with the first preferred embodiment, however, the second liquid level reading ($h_2$) also provides the theoretical liquid level in the tank 20. In other words, because of the above-described configuration of the measuring tube 30, in the absence of leakage, thermal expansion or contraction would cause the liquid level to rise or sink to the same level in the tank 20 as in the measuring tube 30. Thus, the second liquid level reading ($h_2$) is noted, and is preferably entered into the computer 42. Thereafter, the valve 34 is opened to reestablish fluid communication between the interior of the measuring tube 30 and the storage tank 20.

The position of the float 38 is then measured again to provide the third liquid level reading ($h_3$), which reflects the actual level of fuel 22 in the tank 20 at the end of the leakage measurement. The difference ($h_2$ minus $h_3$) between the second liquid level reading ($h_2$) and the third liquid level reading ($h_3$) is the measure of the amount of leakage. This amount can be calculated using the appropriate algorithm selected from Equations 7, 8, or 9. Alternatively, and preferably in accordance with the present invention, a measured amount of fuel is added or is withdrawn from the tank 22 until the liquid level is restored to the level of the second reading ($h_2$). The amount of fuel added or withdrawn in this manner provides the volume of leakage which has occurred during the time period of the measurement, and is readily converted into a gallon/hour figure.

Referring now to FIG. 4, a third embodiment of the apparatus of the present invention is shown. The third embodiment operates substantially on the same principle as the second embodiment, that is, throughout substantially the entire depth of the tank 20 the horizontal cross-sections (A) of the tank 20 and of the empty space in the measuring tube 30 have a fixed ratio. The requirements of $V_1 = f(h)$ and $V_2 = K_1 + K_2 f(h)$ are met in the third preferred embodiment by providing a substantially cylindrical measuring tube 30, and an appropriately configured spacer body 52 in the tube 30. The float 38 of the third preferred embodiment is preferably doughnut-shaped and surrounds the spacer 52, as is schematically indicated in FIG. 4. An optical fiber containing a displacement sensor is used in the float and sensor assembly of the third embodiment, although other types of displacement sensors can be used as well.

Referring now back to FIGS. 1 and 2, a preferred construction of the float and sensor assembly 36 of the present invention is disclosed. Although the above-described generic concepts of the invention are not dependent on the use of any particular type of float and sensor assembly, the hereinafter-described float and sensor assembly provides accurate results and is believed to be novel and innovative on its own right.

Referring now primarily to FIG. 2, the assembly includes a mounting tube 54 which telescopically fits into the measuring tube 30. The measuring tube 30 is designed to fit through the standard fill holes 26 of storage tanks 20 of filling stations, and therefore, generally speaking, does not exceed 3 inches in diameter. A clamping mechanism is mounted to the bottom of the mounting tube 54. The clamping mechanism includes a cone-shaped member 56 which is threadedly mounted to a bottom closure member 58 of the mounting tube 54. The position of the cone-shaped member 56 can be controlled from the surface by manually turning a rotatable shaft 60 coaxially disposed within the mounting tube 54. The cone-shaped member 56 engages three clamping dogs 62, only one of which is visible on FIG. 2. The clamping dogs 62 engage the interior of the measuring tube 30. It should be apparent from the foregoing that by wedging the clamping dogs 62 against the interior of the measuring tube 30, the assembly can be mounted at substantially any desired location in the measuring tube 30. Adjustment of the positioning of the assembly is performed from the surface before the clamping dogs 62 are tightened, by a conventional adjusting mechanism 64 which includes an adjusting screw 66, shown on FIG. 1.

A shaft 68 protrudes from the center of the mounting tube 54 and is carried by the mounting tube 54 independently of the rotational positioning of the cone-shaped member 56. One or more optical fibers (not shown) are disposed within the shaft 68 and comprise part of the state-of-the-art displacement sensor assembly. A piston 70 is fixedly mounted to the shaft 68. A float cup 72 is placed around the piston 70, but is nevertheless capable of moving freely relative to the piston 70 in a linear up-and-down direction. The float cup 72 is restricted in any potential sideways movement by a compliant glass fiber fabric, resilient rubber or like diaphragm 74 mounted on the top of the float cup 72. A center hole in the diaphragm 74 accommodates the shaft 68. A dampening fluid 76, such as a commercially available silicone dampening fluid, may be present in the float cup 72. The fiber optic sensor measures the displacement of the bottom of the float cup 72 from the shaft 68.

A principal advantage of the above-described float and sensor assembly is that the diaphragm substantially prevents friction and stiction of the float cup 72 to the interior walls of the measuring tube 30. For operation, the entire assembly, including the mounting tube 54, is adjusted into such a position that the float cup 72 floats in the fuel 22 contained in the tank. The clamping dogs 62 are then tightened, whereafter actual measurements may start.

Placing the clamping dogs 62 close to the liquid surface provides the additional advantage that the fixed reference point thermally expands (or contracts) only with that portion of the measuring tube which is under liquid.

Several modifications of the above-described processes and apparatus may become readily apparent to those skilled in the art in light of the foregoing disclosure. Therefore, the scope of the present invention should be interpreted solely from the following claims, as such claims are read in light of the disclosure.

TABLE 1

| DEPTH | VOLUME ST | STEEL TANK % FULL | dV/dh ST | TUBE ST | dh/200 ml |
|---|---|---|---|---|---|
| 96 | 2345186.35 | 100.00 | 0 | 0 | u-in ST |
| 95.995 | 2345184.85 | 100.00 | 448.94 | .323 | 27186.51 |
| 95.99 | 2345182.12 | 100.00 | 634.87 | .384 | 19224.27 |
| 95.98 | 2345174.38 | 100.00 | 897.80 | .457 | 13594.32 |
| 95.97 | 2345164.36 | 100.00 | 1099.52 | .505 | 11100.29 |
| 95.96 | 2345152.49 | 100.00 | 1269.55 | .543 | 9613.64 |
| 95.95 | 2345139.03 | 100.00 | 1419.33 | .574 | 8599.15 |
| 95.90 | 2345052.54 | 99.99 | 2006.71 | .683 | 6082.10 |
| 95.85 | 2344940.57 | 99.99 | 2457.07 | .755 | 4967.31 |
| 95.80 | 2344808.00 | 99.98 | 2836.43 | .811 | 4302.94 |
| 95.60 | 2344116.89 | 99.95 | 4007.13 | .964 | 3045.82 |
| 95.40 | 2343222.85 | 99.92 | 4902.58 | 1.067 | 2489.50 |
| 95.20 | 2342165.25 | 99.87 | 5655.08 | 1.146 | 2158.24 |
| 95 | 2340966.88 | 99.82 | 6315.92 | 1.211 | 1932.42 |
| 94.50 | 2337446.90 | 99.67 | 7715.01 | 1.338 | 1581.98 |
| 94 | 2333289.52 | 99.49 | 8884.93 | 1.436 | 1373.67 |
| 93 | 2323399.86 | 99.07 | 10823.73 | 1.585 | 1127.61 |
| 92 | 2311751.08 | 98.57 | 12430.80 | 1.699 | 981.84 |
| 91 | 2298609.57 | 98.01 | 13822.31 | 1.791 | 882.99 |
| 90 | 2284158.09 | 97.40 | 15058.16 | 1.870 | 810.52 |
| 89 | 2268533.10 | 96.73 | 16174.06 | 1.938 | 754.60 |
| 88 | 2251842.09 | 96.02 | 17193.38 | 1.998 | 709.87 |
| 87 | 2234173.05 | 95.27 | 18132.42 | 2.052 | 673.10 |
| 86 | 2215600.00 | 94.47 | 19003.09 | 2.100 | 642.26 |
| 85 | 2196186.63 | 93.65 | 19814.39 | 2.145 | 615.97 |
| 84 | 2175988.64 | 92.79 | 20573.36 | 2.185 | 593.24 |
| 83 | 2155055.48 | 91.89 | 21285.59 | 2.223 | 573.39 |
| 82 | 2133431.51 | 90.97 | 21955.63 | 2.258 | 555.89 |
| 81 | 2111157.02 | 90.02 | 22587.24 | 2.290 | 540.35 |
| 80 | 2088268.80 | 89.04 | 23183.55 | 2.320 | 526.45 |
| 79 | 2064800.78 | 88.04 | 23747.23 | 2.348 | 513.95 |
| 78 | 2040784.45 | 87.02 | 24280.55 | 2.374 | 502.67 |
| 77 | 2016249.14 | 85.97 | 24785.47 | 2.399 | 492.43 |
| 76 | 1991222.40 | 84.91 | 25263.69 | 2.422 | 483.10 |
| 75 | 1965730.16 | 83.82 | 25716.70 | 2.443 | 474.59 |
| 74 | 1939796.96 | 82.71 | 26145.82 | 2.464 | 466.81 |
| 73 | 1913446.11 | 81.59 | 26552.19 | 2.483 | 459.66 |
| 72 | 1886699.82 | 80.45 | 26936.85 | 2.501 | 453.10 |
| 71 | 1859579.33 | 79.29 | 27300.73 | 2.517 | 447.06 |
| 70 | 1832105.02 | 78.12 | 27644.62 | 2.533 | 441.50 |
| 69 | 1804296.49 | 76.94 | 27969.29 | 2.548 | 436.37 |
| 68 | 1776172.63 | 75.74 | 28275.38 | 2.562 | 431.65 |
| 67 | 1747751.72 | 74.53 | 28563.50 | 2.575 | 427.29 |
| 66 | 1719051.45 | 73.30 | 28834.18 | 2.587 | 423.28 |
| 65 | 1690089.01 | 72.07 | 29087.91 | 2.598 | 419.59 |
| 64 | 1660881.13 | 70.82 | 29325.13 | 2.609 | 416.20 |
| 63 | 1631444.11 | 69.57 | 29546.24 | 2.619 | 413.08 |
| 62 | 1601793.89 | 68.30 | 29751.60 | 2.628 | 410.23 |
| 61 | 1571946.06 | 67.03 | 29941.53 | 2.636 | 407.63 |
| 60 | 1541915.89 | 65.75 | 30116.32 | 2.644 | 405.26 |
| 59 | 1511718.38 | 64.46 | 30276.24 | 2.651 | 403.12 |
| 58 | 1481368.29 | 63.17 | 30421.51 | 2.657 | 401.20 |
| 57 | 1450880.16 | 61.87 | 30552.36 | 2.663 | 399.48 |
| 56 | 1420268.33 | 60.56 | 30668.96 | 2.668 | 397.96 |
| 55 | 1389546.94 | 59.25 | 30771.47 | 2.673 | 396.63 |
| 54 | 1358730.03 | 57.94 | 30860.04 | 2.676 | 395.50 |
| 53 | 1327831.47 | 56.62 | 30934.79 | 2.680 | 394.54 |
| 52 | 1296865.02 | 55.30 | 30995.81 | 2.682 | 393.76 |
| 51 | 1265844.39 | 53.98 | 31043.19 | 2.684 | 393.16 |
| 50 | 1234783.17 | 52.65 | 31076.99 | 2.686 | 392.73 |
| 49 | 1203694.92 | 51.33 | 31097.25 | 2.687 | 392.48 |
| 48 | 1172593.17 | 50.00 | 31104 | 2.687 | 392.39 |
| 47 | 1141491.42 | 48.67 | 31097.25 | 2.687 | 392.48 |

TABLE 1-continued

STEEL TANK

| DEPTH | VOLUME ST | % FULL | dV/dh ST | TUBE ST | dh/200 ml |
|---|---|---|---|---|---|
| 46 | 1110403.18 | 47.35 | 31076.99 | 2.686 | 392.73 |
| 45 | 1079341.96 | 46.02 | 31043.19 | 2.684 | 393.16 |
| 44 | 1048321.33 | 44.70 | 30995.81 | 2.682 | 393.76 |
| 43 | 1017354.88 | 43.38 | 30934.79 | 2.680 | 394.54 |
| 42 | 986456.32 | 42.06 | 30860.04 | 2.676 | 395.50 |
| 41 | 955639.41 | 40.75 | 30771.47 | 2.673 | 396.63 |
| 40 | 924918.02 | 39.44 | 30668.96 | 2.668 | 397.96 |
| 39 | 894306.19 | 38.13 | 30552.36 | 2.663 | 399.48 |
| 38 | 863818.06 | 36.83 | 30421.51 | 2.657 | 401.20 |
| 37 | 833467.97 | 35.54 | 30276.24 | 2.651 | 403.12 |
| 36 | 803270.46 | 34.25 | 30116.32 | 2.644 | 405.26 |
| 35 | 773240.29 | 32.97 | 29941.53 | 2.636 | 407.63 |
| 34 | 743392.46 | 31.70 | 29751.60 | 2.628 | 410.23 |
| 33 | 713742.24 | 30.43 | 29546.24 | 2.619 | 413.08 |
| 32 | 684305.22 | 29.18 | 29325.13 | 2.609 | 416.20 |
| 31 | 655097.34 | 27.93 | 29087.91 | 2.598 | 419.59 |
| 30 | 626134.90 | 26.70 | 28834.18 | 2.587 | 423.28 |
| 29 | 597434.63 | 25.47 | 28563.50 | 2.575 | 427.29 |
| 28 | 569013.72 | 24.26 | 28275.38 | 2.562 | 431.65 |
| 27 | 540889.86 | 23.06 | 27969.29 | 2.548 | 436.37 |
| 26 | 513081.33 | 21.88 | 27644.62 | 2.533 | 441.50 |
| 25 | 485607.02 | 20.71 | 27300.73 | 2.517 | 447.06 |
| 24 | 458486.53 | 19.55 | 26936.85 | 2.501 | 453.10 |
| 23 | 431740.24 | 18.41 | 26552.19 | 2.483 | 459.66 |
| 22 | 405389.39 | 17.29 | 26145.82 | 2.464 | 466.81 |
| 21 | 379456.19 | 16.18 | 25716.70 | 2.443 | 474.59 |
| 20 | 353963.95 | 15.09 | 25263.69 | 2.422 | 483.10 |
| 19 | 328937.21 | 14.03 | 24785.47 | 2.399 | 492.43 |
| 18 | 304401.90 | 12.98 | 24280.55 | 2.374 | 502.67 |
| 17 | 280385.57 | 11.96 | 23747.23 | 2.348 | 513.95 |
| 16 | 256917.55 | 10.96 | 23183.55 | 2.320 | 526.45 |
| 15 | 234029.33 | 9.98 | 22587.24 | 2.290 | 540.35 |
| 14 | 211754.83 | 9.03 | 21955.63 | 2.258 | 555.89 |
| 13 | 190130.87 | 8.11 | 21285.59 | 2.223 | 573.39 |
| 12 | 169197.71 | 7.21 | 20573.36 | 2.185 | 593.24 |
| 11 | 148999.72 | 6.35 | 19814.39 | 2.145 | 615.97 |
| 10 | 129586.35 | 5.53 | 19003.09 | 2.100 | 642.26 |
| 9 | 111013.30 | 4.73 | 18132.42 | 2.052 | 673.10 |
| 8 | 93344.26 | 3.98 | 17193.38 | 1.998 | 709.87 |
| 7 | 76653.25 | 3.27 | 16174.06 | 1.938 | 754.60 |
| 6 | 61028.26 | 2.60 | 15058.16 | 1.870 | 810.52 |
| 5 | 46576.78 | 1.99 | 13822.31 | 1.791 | 882.99 |
| 4 | 33435.27 | 1.43 | 12430.80 | 1.699 | 981.84 |
| 3 | 21786.49 | .93 | 10823.73 | 1.585 | 1127.61 |
| 2 | 11896.83 | .51 | 8884.93 | 1.436 | 1373.67 |
| 1 | 4219.47 | .18 | 6315.92 | 1.211 | 1932.42 |
| 0 | 0 | 0 | 0 | 0 | |

TABLE 2

GLASS TANK SPHERICAL ENDS

| DEPTH | VOLUME SPHER | % FULL | dh/200 ml | dV/dh SPHER | TUBE SPH |
|---|---|---|---|---|---|
| 92 | 2247645.59 | 100.00 | mu-in | 0 | 0 |
| 91 | 2243973.99 | 99.84 | 2192.58 | 5566.51 | 1.140 |
| 90 | 2237129.66 | 99.53 | 1527.10 | 7992.27 | 1.366 |
| 89 | 2228161.38 | 99.13 | 1234.82 | 9884.05 | 1.519 |
| 88 | 2217455.02 | 98.66 | 1062.09 | 11491.55 | 1.638 |
| 87 | 2205240.18 | 98.11 | 945.24 | 12912.00 | 1.736 |
| 86 | 2191676.45 | 97.51 | 859.78 | 14195.53 | 1.820 |
| 85 | 2176884.69 | 96.85 | 793.97 | 15372.03 | 1.894 |
| 84 | 2160961.49 | 96.14 | 741.45 | 16461.07 | 1.960 |
| 83 | 2143987.12 | 95.39 | 698.37 | 17476.28 | 2.020 |
| 82 | 2126030.18 | 94.59 | 662.32 | 18427.65 | 2.074 |
| 81 | 2107150.57 | 93.75 | 631.64 | 19322.72 | 2.124 |
| 80 | 2087401.54 | 92.87 | 605.19 | 20167.36 | 2.170 |
| 79 | 2066831.09 | 91.96 | 582.13 | 20966.26 | 2.212 |
| 78 | 2045482.98 | 91.01 | 561.84 | 21723.24 | 2.252 |
| 77 | 2023397.52 | 90.02 | 543.86 | 22441.44 | 2.289 |
| 76 | 2000612.15 | 89.01 | 527.82 | 23123.47 | 2.323 |
| 75 | 1977161.88 | 87.97 | 513.43 | 23771.58 | 2.355 |
| 74 | 1953079.68 | 86.89 | 500.46 | 24387.65 | 2.386 |
| 73 | 1928396.72 | 85.80 | 488.72 | 24973.32 | 2.414 |
| 72 | 1903142.69 | 84.67 | 478.06 | 25530.02 | 2.441 |
| 71 | 1877345.93 | 83.52 | 468.36 | 26058.99 | 2.466 |
| 70 | 1851033.60 | 82.35 | 459.50 | 26561.32 | 2.490 |
| 69 | 1824231.85 | 81.16 | 451.40 | 27037.97 | 2.512 |
| 68 | 1796965.93 | 79.95 | 443.98 | 27489.81 | 2.533 |
| 67 | 1769260.26 | 78.72 | 437.18 | 27917.59 | 2.553 |

TABLE 2-continued
GLASS TANK SPHERICAL ENDS

| DEPTH | VOLUME SPHER | % FULL | dh/200 ml | dV/dh SPHER | TUBE SPH |
|---|---|---|---|---|---|
| 66 | 1741138.55 | 77.46 | 430.94 | 28321.99 | 2.571 |
| 65 | 1712623.86 | 76.20 | 425.21 | 28703.63 | 2.588 |
| 64 | 1683738.69 | 74.91 | 419.95 | 29063.05 | 2.604 |
| 63 | 1654505.01 | 73.61 | 415.13 | 29400.74 | 2.620 |
| 62 | 1624944.31 | 72.30 | 410.71 | 29717.14 | 2.634 |
| 61 | 1595077.69 | 70.97 | 406.66 | 30012.66 | 2.647 |
| 60 | 1564925.84 | 69.63 | 402.97 | 30287.64 | 2.659 |
| 59 | 1534509.14 | 68.27 | 399.61 | 30542.42 | 2.670 |
| 58 | 1503847.65 | 66.91 | 396.56 | 30777.27 | 2.680 |
| 57 | 1472961.15 | 65.53 | 393.81 | 30992.47 | 2.689 |
| 56 | 1441869.18 | 64.15 | 391.33 | 31188.23 | 2.698 |
| 55 | 1410591.09 | 62.76 | 389.13 | 31364.77 | 2.706 |
| 54 | 1379145.99 | 61.36 | 387.19 | 31522.27 | 2.712 |
| 53 | 1347552.85 | 59.95 | 385.49 | 31660.87 | 2.718 |
| 52 | 1315830.49 | 58.54 | 384.04 | 31780.73 | 2.723 |
| 51 | 1283997.60 | 57.13 | 382.82 | 31881.96 | 2.728 |
| 50 | 1252072.75 | 55.71 | 381.83 | 31964.65 | 2.731 |
| 49 | 1220074.45 | 54.28 | 381.06 | 32028.89 | 2.734 |
| 48 | 1188021.11 | 52.86 | 380.52 | 32074.72 | 2.736 |
| 47 | 1155931.11 | 51.43 | 380.19 | 32102.21 | 2.737 |
| 46 | 1123822.80 | 50.00 | 380.08 | 32111.37 | 2.738 |
| 45 | 1091714.48 | 48.57 | 380.19 | 32102.21 | 2.737 |
| 44 | 1059624.48 | 47.14 | 380.52 | 32074.72 | 2.736 |
| 43 | 1027571.15 | 45.72 | 381.06 | 32028.89 | 2.734 |
| 42 | 995572.85 | 44.29 | 381.83 | 31964.65 | 2.731 |
| 41 | 963648.00 | 42.87 | 382.82 | 31881.96 | 2.728 |
| 40 | 931815.10 | 41.46 | 384.04 | 31780.73 | 2.723 |
| 39 | 900092.74 | 40.05 | 385.49 | 31660.87 | 2.718 |
| 38 | 868499.61 | 38.64 | 387.19 | 31522.27 | 2.712 |
| 37 | 837054.51 | 37.24 | 389.13 | 31364.77 | 2.706 |
| 36 | 805776.41 | 35.85 | 391.33 | 31188.23 | 2.698 |
| 35 | 774684.45 | 34.47 | 393.81 | 30992.47 | 2.689 |
| 34 | 743797.95 | 33.09 | 396.56 | 30777.27 | 2.680 |
| 33 | 713136.45 | 31.73 | 399.61 | 30542.42 | 2.670 |
| 32 | 682719.75 | 30.37 | 402.97 | 30287.64 | 2.659 |
| 31 | 652567.91 | 29.03 | 406.66 | 30012.66 | 2.647 |
| 30 | 622701.28 | 27.70 | 410.71 | 29717.14 | 2.634 |
| 29 | 593140.59 | 26.39 | 415.13 | 29400.74 | 2.620 |
| 28 | 563906.90 | 25.09 | 419.95 | 29063.05 | 2.604 |
| 27 | 535021.73 | 23.80 | 425.21 | 28703.63 | 2.588 |
| 26 | 506507.05 | 22.54 | 430.94 | 28321.99 | 2.571 |
| 25 | 478385.34 | 21.28 | 437.18 | 27917.59 | 2.553 |
| 24 | 450679.67 | 20.05 | 443.98 | 27489.81 | 2.533 |
| 23 | 423413.74 | 18.84 | 451.40 | 27037.97 | 2.512 |
| 22 | 396612.00 | 17.65 | 459.50 | 26561.32 | 2.490 |
| 21 | 370299.67 | 16.48 | 468.36 | 26058.99 | 2.466 |
| 20 | 344502.90 | 15.33 | 478.06 | 25530.02 | 2.441 |
| 19 | 319248.87 | 14.20 | 488.72 | 24973.32 | 2.414 |
| 18 | 294565.92 | 13.11 | 500.46 | 24387.65 | 2.386 |
| 17 | 270483.71 | 12.03 | 513.43 | 23771.58 | 2.355 |
| 16 | 247033.44 | 10.99 | 527.82 | 23123.47 | 2.323 |
| 15 | 224248.07 | 9.98 | 543.86 | 22441.44 | 2.289 |
| 14 | 202162.62 | 8.99 | 561.84 | 21723.24 | 2.252 |
| 13 | 180814.51 | 8.04 | 582.13 | 20966.26 | 2.212 |
| 12 | 160244.05 | 7.13 | 605.19 | 20167.36 | 2.170 |
| 11 | 140495.03 | 6.25 | 631.64 | 19322.72 | 2.124 |
| 10 | 121615.42 | 5.41 | 662.32 | 18427.65 | 2.074 |
| 9 | 103658.47 | 4.61 | 698.37 | 17476.28 | 2.020 |
| 8 | 86684.10 | 3.86 | 741.45 | 16461.07 | 1.960 |
| 7 | 70760.91 | 3.15 | 793.97 | 15372.03 | 1.894 |
| 6 | 55969.14 | 2.49 | 859.78 | 14195.53 | 1.820 |
| 5 | 42405.42 | 1.89 | 945.24 | 12912.00 | 1.736 |
| 4 | 30190.57 | 1.34 | 1062.09 | 11491.55 | 1.638 |
| 3 | 19484.21 | .87 | 1234.82 | 9884.05 | 1.519 |
| 2 | 10515.93 | .47 | 1527.10 | 7992.27 | 1.366 |
| 1 | 3671.61 | .16 | 2192.58 | 5566.51 | 1.140 |
| 0 | .00 | .00 |  | 0 | 0 |

TABLE 3
GLASS TANK ELLIPTICAL ENDS

| DEPTH | VOLUME ELLIP | % FULL | dh/200 ml | dV/dh ELLIP | TUBE EU |
|---|---|---|---|---|---|
| 92 | 2249196.70 | 100.00 | mu-in | 0 | 0 |
| 91 | 2245202.94 | 99.82 | 2029.73 | 6013.10 | 1.185 |
| 90 | 2237855.20 | 99.50 | 1429.38 | 8538.66 | 1.412 |
| 89 | 2228315.47 | 99.07 | 1165.21 | 10474.47 | 1.564 |
| 88 | 2217008.88 | 98.57 | 1008.84 | 12098.10 | 1.680 |
| 87 | 2204186.79 | 98.00 | 902.89 | 13517.65 | 1.776 |

TABLE 3-continued

GLASS TANK ELLIPTICAL ENDS

| DEPTH | VOLUME ELLIP | % FULL | dh/200 ml | dV/dh ELLIP | TUBE EU |
|---|---|---|---|---|---|
| 86 | 2190022.81 | 97.37 | 825.29 | 14788.82 | 1.858 |
| 85 | 2174647.40 | 96.69 | 765.45 | 15944.87 | 1.929 |
| 84 | 2158164.13 | 95.95 | 717.62 | 17007.53 | 1.992 |
| 83 | 2140658.37 | 95.17 | 678.36 | 17991.97 | 2.049 |
| 82 | 2122202.53 | 94.35 | 645.45 | 18909.28 | 2.101 |
| 81 | 2102859.37 | 93.49 | 617.42 | 19767.84 | 2.148 |
| 80 | 2082684.24 | 92.60 | 593.22 | 20574.20 | 2.191 |
| 79 | 2061726.63 | 91.67 | 572.10 | 21333.55 | 2.231 |
| 78 | 2040031.38 | 90.70 | 553.51 | 22050.14 | 2.269 |
| 77 | 2017639.44 | 89.70 | 537.02 | 22727.46 | 2.303 |
| 76 | 1994588.57 | 88.68 | 522.29 | 23368.42 | 2.335 |
| 75 | 1970913.88 | 87.63 | 509.06 | 23975.51 | 2.366 |
| 74 | 1946648.13 | 86.55 | 497.13 | 24550.83 | 2.394 |
| 73 | 1921822.19 | 85.44 | 486.33 | 25096.21 | 2.420 |
| 72 | 1896465.17 | 84.32 | 476.51 | 25613.22 | 2.445 |
| 71 | 1870604.75 | 83.17 | 467.57 | 26103.24 | 2.468 |
| 70 | 1844267.28 | 82.00 | 459.40 | 26567.50 | 2.490 |
| 69 | 1817477.99 | 80.81 | 451.92 | 27007.05 | 2.511 |
| 68 | 1790261.08 | 79.60 | 445.07 | 27422.87 | 2.530 |
| 67 | 1762639.89 | 78.37 | 438.78 | 27815.78 | 2.548 |
| 66 | 1734636.91 | 77.12 | 433.01 | 28186.55 | 2.565 |
| 65 | 1706273.95 | 75.86 | 427.71 | 28535.85 | 2.581 |
| 64 | 1677572.16 | 74.59 | 422.84 | 28864.30 | 2.595 |
| 63 | 1648552.12 | 73.30 | 418.37 | 29172.44 | 2.609 |
| 62 | 1619233.89 | 71.99 | 414.28 | 29460.75 | 2.622 |
| 61 | 1589637.07 | 70.68 | 410.53 | 29729.69 | 2.634 |
| 60 | 1559780.83 | 69.35 | 407.11 | 29979.65 | 2.645 |
| 59 | 1529683.97 | 68.01 | 403.99 | 30210.99 | 2.655 |
| 58 | 1499364.95 | 66.66 | 401.16 | 30424.03 | 2.665 |
| 57 | 1468841.92 | 65.31 | 398.61 | 30619.05 | 2.673 |
| 56 | 1438132.76 | 63.94 | 396.31 | 30796.32 | 2.681 |
| 55 | 1407255.12 | 62.57 | 394.27 | 30956.06 | 2.688 |
| 54 | 1376226.42 | 61.19 | 392.46 | 31098.47 | 2.694 |
| 53 | 1345063.89 | 59.80 | 390.89 | 31223.73 | 2.699 |
| 52 | 1313784.62 | 58.41 | 389.54 | 31331.99 | 2.704 |
| 51 | 1282405.54 | 57.02 | 388.41 | 31423.38 | 2.708 |
| 50 | 1250943.45 | 55.62 | 387.48 | 31498.01 | 2.711 |
| 49 | 1219415.07 | 54.22 | 386.77 | 31555.97 | 2.714 |
| 48 | 1187837.05 | 52.81 | 386.27 | 31597.31 | 2.716 |
| 47 | 1156225.96 | 51.41 | 385.96 | 31622.10 | 2.717 |
| 46 | 1124598.35 | 50.00 | 385.86 | 31630.37 | 2.717 |
| 45 | 1092970.74 | 48.59 | 385.96 | 31622.10 | 2.717 |
| 44 | 1061359.65 | 47.19 | 386.27 | 31597.31 | 2.716 |
| 43 | 1029781.63 | 45.78 | 386.77 | 31555.97 | 2.714 |
| 42 | 998253.26 | 44.38 | 387.48 | 31498.01 | 2.711 |
| 41 | 966791.17 | 42.98 | 388.41 | 31423.38 | 2.708 |
| 40 | 935412.08 | 41.59 | 389.54 | 31331.99 | 2.704 |
| 39 | 904132.81 | 40.20 | 390.89 | 31223.73 | 2.699 |
| 38 | 872970.29 | 38.81 | 392.46 | 31098.47 | 2.694 |
| 37 | 841941.59 | 37.43 | 394.27 | 30956.06 | 2.688 |
| 36 | 811063.94 | 36.06 | 396.31 | 30796.32 | 2.681 |
| 35 | 780354.79 | 34.69 | 398.61 | 30619.05 | 2.673 |
| 34 | 749831.76 | 33.34 | 401.16 | 30424.03 | 2.665 |
| 33 | 719512.73 | 31.99 | 403.99 | 30210.99 | 2.655 |
| 32 | 689415.87 | 30.65 | 407.11 | 29979.65 | 2.645 |
| 31 | 659559.63 | 29.32 | 410.53 | 29729.69 | 2.634 |
| 30 | 629962.81 | 28.01 | 414.28 | 29460.75 | 2.622 |
| 29 | 600644.59 | 26.70 | 418.37 | 29172.44 | 2.609 |
| 28 | 571624.55 | 25.41 | 422.84 | 28864.30 | 2.595 |
| 27 | 542922.76 | 24.14 | 427.71 | 28535.85 | 2.581 |
| 26 | 514559.79 | 22.88 | 433.01 | 28186.55 | 2.565 |
| 25 | 486556.82 | 21.63 | 438.78 | 27815.78 | 2.548 |
| 24 | 458935.62 | 20.40 | 445.07 | 27422.87 | 2.530 |
| 23 | 431718.72 | 19.19 | 451.92 | 27007.05 | 2.511 |
| 22 | 404929.43 | 18.00 | 459.40 | 26567.50 | 2.490 |
| 21 | 378591.96 | 16.83 | 467.57 | 26103.24 | 2.468 |
| 20 | 352731.53 | 15.68 | 476.51 | 25613.22 | 2.445 |
| 19 | 327374.52 | 14.56 | 486.33 | 25096.21 | 2.420 |
| 18 | 302548.57 | 13.45 | 497.13 | 24550.83 | 2.394 |
| 17 | 278282.83 | 12.37 | 509.06 | 23975.51 | 2.366 |
| 16 | 254608.13 | 11.32 | 522.29 | 23368.42 | 2.335 |
| 15 | 231557.27 | 10.30 | 537.02 | 22727.46 | 2.303 |
| 14 | 209165.32 | 9.30 | 553.51 | 22050.14 | 2.269 |
| 13 | 187470.07 | 8.33 | 572.10 | 21333.55 | 2.231 |
| 12 | 166512.47 | 7.40 | 593.22 | 20574.20 | 2.191 |
| 11 | 146337.33 | 6.51 | 617.42 | 19767.84 | 2.148 |
| 10 | 126994.17 | 5.65 | 645.45 | 18909.28 | 2.101 |
| 9 | 108538.33 | 4.83 | 678.36 | 17991.97 | 2.049 |
| 8 | 91032.57 | 4.05 | 717.62 | 17007.53 | 1.992 |
| 7 | 74549.30 | 3.31 | 765.45 | 15944.87 | 1.929 |

TABLE 3-continued

| | GLASS TANK ELLIPTICAL ENDS | | | | |
|---|---|---|---|---|---|
| DEPTH | VOLUME ELLIP | % FULL | dh/200 ml | dV/dh ELLIP | TUBE EU |
| 6 | 59173.89 | 2.63 | 825.29 | 14788.82 | 1.858 |
| 5 | 45009.91 | 2.00 | 902.89 | 13517.65 | 1.776 |
| 4 | 32187.83 | 1.43 | 1008.84 | 12098.10 | 1.680 |
| 3 | 20881.23 | .93 | 1165.21 | 10474.47 | 1.564 |
| 2 | 11341.50 | .50 | 1429.38 | 8538.66 | 1.412 |
| 1 | 3993.76 | .18 | 2029.73 | 6013.10 | 1.185 |
| 0 | .00 | .00 | | 0 | 0 |

What is claimed is:

1. A process for measuring slow changes in the level of a liquid stored in a storage tank in an environment wherein the temperature of the liquid is prone to change during the measurement, such as measuring leakage of hydrocarbon fuel from an underground tank, the process comprising the steps of:

placing a container into the storage tank in a position where the longitudinal axis of the container is substantially vertical and wherein its bottom reaches substantially to the bottom of the storage tank, the horizontal cross-sectional area of the container being constant along the vertical axis of the container, so that the volume of liquid contained in the container is a linear function of the height of the liquid level in the container;

allowing the container to be in fluid communication with the storage tank whereby the height of the liquid level in the container is even with the liquid level in the storage tank, and measuring the height of the liquid level in the container, the measuring providing a first liquid level reading;

shutting off fluid communication between the container and the storage tank for a fixed time period which is sufficient to allow effective measurement of leakage of liquid out of the storage tank, or into the storage tank;

measuring for a second time the height of the liquid level in the container after expiration of the time period, the second measuring providing a second liquid level reading, any change between the first and second readings being due substantially exclusively to density change of the liquid caused by change of temperature of the liquid during the fixed time period, and after the step of measuring for a second time, allowing fluid communication to occur again between the storage tank and the container, whereby the height of the liquid level in the container and in the storage tank equalizes, and thereafter measuring for a third time the height of the liquid level in the container, the difference in the first and second readings providing the basis for mathematically calculating the theoretical level of the liquid in the storage tank which would have been caused solely by the change in the temperature of the liquid during the fixed time period, and the difference between the calculated theoretical level and the third reading providing the basis for finding the volume of liquid which has leaked into or out of the storage tank during the fixed time period.

2. The process of claim 1 wherein the steps of shutting off fluid communication between the container and the storage tank and allowing fluid communication to occur again between the storage tank and the container comprise, respectively, closing and opening a valve which controls a fluid passage between the container and the storage tank.

3. The process of claim 2 wherein the container has a circular cross-section taken in a horizontal plane.

4. The process of claim 2 wherein the steps of measuring include measuring the position of a float placed in the container, the position of the float being indicative of the liquid level in the container.

5. The process of claim 4 wherein the steps of measuring the position of the float include measuring by the use of a laser interferometer.

6. The process of claim 4 wherein the steps of measuring the position of the float include measuring by the use of non-contact fiber optic probe displacement sensor.

7. The process of claim 2 wherein the storage tank is substantially cylindrical and has its longitudinal axis disposed substantially horizontally, whereby the volume of the liquid contained in the storage tank is not a linear function of the height of the liquid level in the storage tank.

8. An apparatus for measuring slow changes in the level of a liquid stored in a storage tank, comprising:

a container disposed in the interior of the storage tank in a position where the longitudinal axis of the container is substantially vertical;

means for opening and closing fluid communication between the storage tank and the containers;

means for measuring the liquid level in the container, the means for measuring including sensing means and float means disposed within the interior of the container for providing an indication of the level of liquid in the container, the float means including a shaft fixedly mounted in the interior of the container, a damper piston being fixedly mounted to the shaft, a float cup, and flexible diaphragm means mounted to the float cup for engaging the shaft and for substantially centering the float cup about the shaft for up and down motion relative to the shaft, said up and down motion being sensed by the sensing means, and means for displaying the measured liquid levels.

9. The apparatus of claim 8 wherein the sensing means include an optical fiber, and the optical fiber is positioned within the shaft.

10. The apparatus of claim 9 wherein the flexible diaphragm means comprise fiber reinforced rubber.

11. In an apparatus for measuring slow changes in the level of a liquid in a container, such as an apparatus for measuring leakage of liquid out of or into an underground storage tank, the apparatus having a substantially vertically disposed tubular container which is placed into the storage tank, the interior of the container being in fluid communication with the tank, float means mounted into the interior of the container for providing an indication of the level of the liquid in the container, and sensing means for detecting the position of the float means, the improvement comprising:
- a shaft included in the float means and fixedly mounted to the container;
- a damper piston fixedly mounted to the shaft;
- a float cup included in the float means, and flexible diaphragm means mounted to the float cup for engaging the shaft and for substantially centering the float cup about the shaft for up and down motion relative to the shaft, said up and down motion being sensed by the sensing means.

12. The improvement of claim 11 wherein a dampening liquid is contained in the float cup.

13. The improvement of claim 11 wherein the sending means include an optical fiber, and the optical fiber is positioned within the shaft.

14. The improvement of claim 11 wherein the flexible diaphragm means comprise fiber reinforced rubber.

15. The improvement of claim 11 further comprising means for removably but fixedly mounting the float means within the container so as to operatively position the float cup to float in the liquid in the container.

16. The improvement of claim 15 further comprising a mounting tube telescopically fitting in the container, the shaft being fixedly and coaxially positioned relative to the mounting tube, and wherein the means for removably but fixedly mounting the float means within the container include means for clamping the mounting tube within a desired position in the container.

* * * * *